Sept. 22, 1925.  W. SINCLAIR  1,554,378

WAGON UNLOADER

Original Filed Jan. 14, 1922

Inventor
William Sinclair
By Alexander Sorell
Attorney

Patented Sept. 22, 1925.

1,554,378

UNITED STATES PATENT OFFICE.

WILLIAM SINCLAIR, OF WREAY SYKE, WESTBROOK, QUEENSLAND, AUSTRALIA.

WAGON UNLOADER.

Application filed January 14, 1922, Serial No. 529,240. Renewed February 18, 1925.

*To all whom it may concern:*

Be it known that I, WILLIAM SINCLAIR, a citizen of the United States, residing at Wreay Syke, Westbrook, Queensland, Australia, have invented certain new and useful Improvements in Wagon Unloaders; and I hereby declare that the following is a full, clear, and exact description thereof, reference being had to the accompanying drawings, which form part of this specification.

This invention is an improvement in means for unloading wagons; and its object is to provide a novel unloading attachment for a vehicle body by which material on or in the body, such as fodder, hay, corn, wood, and the like, can be quickly discharged from the vehicle.

I will explain the invention with reference to the accompanying drawings which illustrate one practical embodiment thereof, which will enable others to construct and use the same; and I summarize in the claims, the essentials of the invention, novel features of construction, and novel combinations of parts for which I desire protection.

Figure 1:
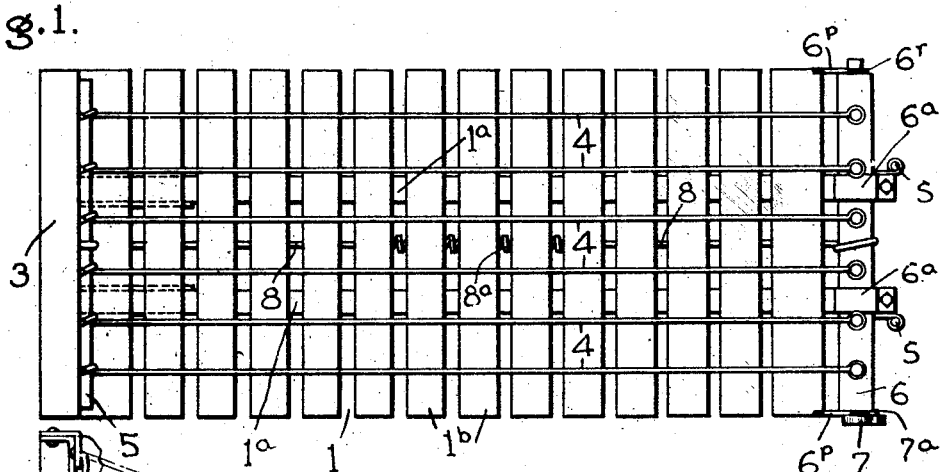
Fig. 1 is a conventional top plan view of a vehicle body with my novel unloading devices applied thereto.

The device is applicable to vehicle bodies of various sizes and kinds; being particularly intended for use on farm wagons, and in the drawings I show a wagon body 1 which may be of any suitable construction, being shown as of the platform type, having two parallel longitudinal bottom sills 1$^a$, on which are secured, in any desired manner, transversely disposed floor planks 1$^b$ which are preferably slightly spaced apart.

At the front end of this body and attached to the ends of sills 1$^a$ are parallel uprights 2 (see Fig. 4) which are preferably made of angle-iron, which extend below the bottom planks 1$^b$ and are securely bolted to the sills 1$^a$ as shown, but said uprights may be secured to the body in any other suitable manner. These uprights are preferably strengthened by cross braces 2$^a$, as shown. Mounted upon the top of the uprights 2 is a transverse bar 3 which is preferably of the same length as the width of the body. To this bar 3 is connected a flexible discharging means which may be of any suitable construction, such as a belt, or sheet of canvas netting or other suitable material; or a set of connected members, such as chains, cables, or wires, such means being sufficiently long to reach from bar 3 vertically down to the floor of the body, and then horizontally back to the rear end of the body where its rear end is fastened to a shaft or drum 6 which is rotatably mounted in suitable bearings or retainers 6$^a$ which may be attached to the rear ends of the sills 1$^a$. The shaft or drum may be provided with any suitable means to hold the windlass to prevent it turning backward when the discharging means is being tautened to discharge a load.

In the drawings the discharging means is shown as a series of parallel cables 4, said cables having their front ends attached to the bar 3 and their rear ends fastened to the windlass. Preferably a transverse bar 5 is attached to the discharging means at a point adjacent the foot of the uprights 2 parallel with the bar 3, but preferably at such a distance therefrom that when the discharging means is slacked the bar 5 will lie on the floor of the wagon body and close up against the uprights 2 as shown in full lines in Figs. 2 and 3 and the part of the discharging means extending from the bar 5 to the shaft 6 will lie flat on the floor of the body.

The shaft 6 may be rotated by any suitable means. As illustrated, the ends of the windlass are provided with ratchets 6$^r$ which are adapted to be engaged by a pawl 7$^a$ on a lever 7, adapted to engage the adjacent end of the shaft 6 as in Figure 5 so that the operator can use the lever 7 at either end of the shaft to wind up the flexible discharge means. The particular means for operating the shaft is not an essential of the invention; but by turning the shaft the discharge means can be wound up thereon, so as to draw the bar 5 away from the uprights 2 and raise it, and the discharge means, to the position shown in dotted lines in Fig. 2.

Figures 4, 5:
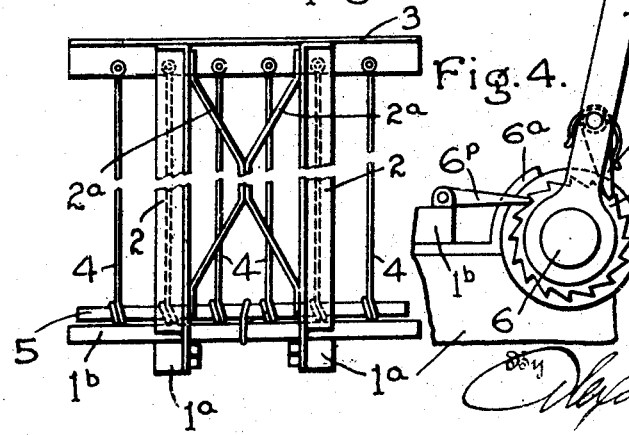
Fig. 4 is a front elevation of the vehicle body, showing the uprights mounted thereon.
Fig. 5 is an enlarged detail plan of the ratchet, and pawl for operating the windlass.

As shown in Figs. 1 and 5 pawls 6$^p$ are mounted adjacent the ratchets 6ʳ for engagement therewith, so that during the winding operation of shaft 6 when pawl 7ᵃ on lever 7 is disengaged from the ratchet 6ʳ, the shaft 6 will not unwind.

Removable uprights S may be suitably detachably attached to the extreme ends of the sills 1ᵃ opposite the uprights 2, so as to retain a load of material such as fodder, hay, wood and the like on the body.

Figure 2:
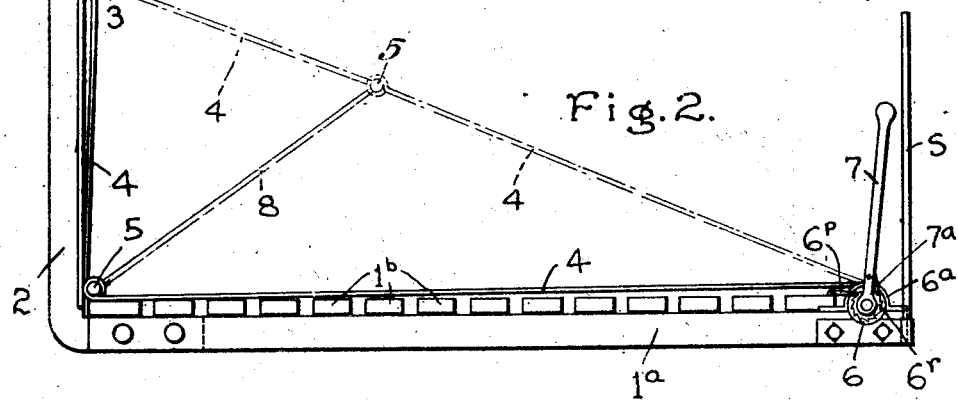
Fig. 2 is a side elevation of Fig. 1 showing the unloading devices in lowered or inoperative position in full lines, and in elevated discharging position in dotted lines.
Figure 3:
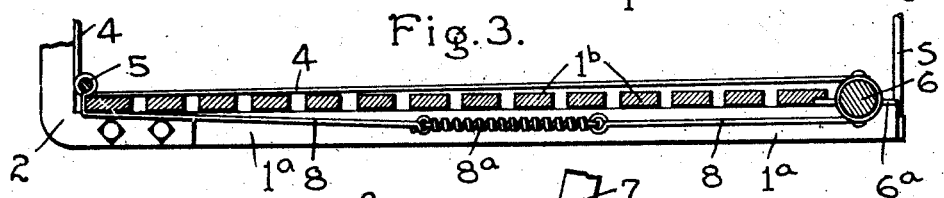
Fig. 3 is an enlarged detail view of the elevating devices.

Preferably a cable 8 may have one end attached to the center of bar 5 (as shown in Fig. 3) and extend under the front end of the body, back to the center of the shaft 6 and be wound thereon oppositely to the flexible discharge means. A spring 8ᵃ may be interposed in the length of this cable 8 to compensate for any inequalities in the winding. When the shaft is turned to slack the discharge means on to the body (the position shown in full lines Fig. 2) the cable 8 will pull the bar 5 and discharge means back to the position shown in full lines in Figure 2. Another purpose of cable 8 and spring 8ᵃ is to hold the flexible discharge means 4 in a slightly stretched condition, when in normal position as shown in full lines in Figure 3, and prevent the discharge means 4 from becoming tangled in any way, especially, where such means is composed of a plurality of cables. When the shaft is wound to discharge the load, the flexible discharge member 4 and bar 5 will be moved to the positions shown in dotted lines in Fig. 2, the cable 8 with spring 8ᵃ being expanded during this operation.

When the wagon body is to be loaded the bar 5 and the discharge means lowered onto the bottom of the wagon, and the body is then loaded in the usual manner. The body may be provided with the usual removable rear stakes, or with sides and end stakes as usual to hold the material. As shown it has removable rear stakes S; and the uprights 2 take the place of the usual front stake.

When the operator wishes to discharge the load he removes stakes S, and turns the shaft 6 as described so as to wind the discharge means and raise the bar 5, and this causes the load to discharge or move by gravity along the discharge means to and off the rear end of the body. The wagon could be backed up so as to discharge the material onto a platform or onto a conveyor, such as commonly used to convey material to a fodder cutter, or into a barn. When discharging a load the discharge means is put under tension as the bar 5 is raised, but when the load is discharged the tension will be lessened and the bar 5 will lower by gravity and by action of cable 8.

Cables 4, shown in Figure 2 are useful for coarse products, such as fodder, hay and the like. A canvas or flexible sheet is preferably employed for handling small grain; or a canvas or other flexible converting may be attached to or laid on the cables 4; so that they can be used for discharging small grain.

This invention would be particularly useful in regard to farm wagons, such as hay-wagons, or even the covered box-type wagon.

As many progressive farmers use elevators to raise grain into cribs, and fodder from the cutter into the hopper, loaded wagons, equipped with my novel unloading device could be emptied quickly and easily into such an elevator.

What I claim is:

1. In combination with a vehicle body, a bar supported thereon above one end thereof, flexible discharge means having one end connected to said bar, and adapted when slack to lie upon the floor of the body and extend toward the other end thereof; and means at the other end of the body disposed at substantially the level of the body floor and connected with said flexible discharge means, whereby the said flexible discharge means may be tautened and thereby caused to rise from the floor and assume an inclined position and discharge the load, substantially as described.

2. In apparatus as set forth in claim 1, the flexible discharge means comprising a plurality of parallel cables, connected at one end to the bar and at the other end to the tautening means, substantially as described.

3. In combination with apparatus as set forth in claim 1, a bar connected with the flexible discharge means intermediate its length and adapted when said means is slacked to lie on the floor, and means connected with bar whereby when the discharge means is slacked the bar is drawn down so as to properly position the discharging means upon the body ready for another load.

4. In combination with a vehicle body, a bar supported thereon above one end thereof, a flexible discharge means connected at one end to said bar and adapted when slack to lie upon the floor of the body and extend toward the other end thereof; and rotatable means at the other end of the body and at substantially the same level as the body, and connected with the free end of said flexible discharge means, whereby the said flexible discharge means may be tautened and caused to rise from the floor and assume an inclined position to discharge the load.

5. In apparatus as set forth in claim 4, the flexible discharge means comprising a plurality of parallel cables connected at one end to the bar and at the other end to the tautening means, substantially as described.

6. In combination with apparatus as set forth in claim 5, a bar connected with the flexible discharge means intermediate its length and adapted when the flexible member is slacked to lie adjacent the lower ends of the uprights; and means connecting this bar with the shaft whereby when the shaft is turned to slack the discharging means the bar is drawn down so as to properly position the discharging means upon the body ready for another load.

7. In combination with a vehicle body, uprights at one end thereof, a bar supported thereon above the floor; a flexible discharge means connected to said bar and adapted when slack to lie upon the floor of the body and extend the length of the body toward the rear end thereof, and a rotatable shaft mounted on the end of the body and at substantially the same level thereof and connected with the free end of said flexible discharge means, whereby the same may be tautened to discharge the load or may be slacked to lie inertly upon the floor; and means for operating said shaft.

8. In apparatus as set forth in claim 7, the flexible discharge means comprising a plurality of parallel cables connected at one end to the bar and at the other end to the shaft, substantially as described.

9. In combination with apparatus as set forth in claim 4, a bar connected with the flexible discharge means intermediate its length and adapted when said means is slacked to lie on the floor of the body adjacent said bar, and means connecting this bar with the rotary means whereby when the latter is turned to slack the discharging means the bar is drawn down so as to properly position the discharging means upon the body ready for another load.

10. In combination with a wagon body, uprights on one end thereof, a bar supported on said upright, a flexible discharge means connected to said bar and adapted when slack to depend beside the uprights and to extend from the uprights toward the rear end of the body, a rotatable shaft on the rear end of the body and substantially level with the wagon body and connected with the free end of said flexible means whereby the same may be tautened to discharge the load, or may be slacked to lie inertly upon the body; and means for operating said shaft.

11. In apparatus as set forth in claim 10, the flexible discharge means comprising a plurality of parallel cables connected at one end to the bar and at the other end to the rotatable shaft, substantially as described.

12. In combination with apparatus as set forth in claim 7, a bar connected with the flexible discharge means intermediate its length and adapted when said discharge means is slacked to lie adjacent the lower end of the upright, and means connecting this bar with the shaft whereby when the shaft is turned to slack the discharging means the bar is drawn down so as to properly position the discharging means upon the body ready for another load.

In testimony that I claim the foregoing as my own, I affix my signature.

WILLIAM SINCLAIR.